United States Patent [19]
Fox

[11] Patent Number: 5,941,274
[45] Date of Patent: Aug. 24, 1999

[54] METHOD AND APPARATUS FOR SECURING A FIRE HYDRANT OR OTHER VALVE DEVICES

[76] Inventor: Peter M. Fox, 959 E. Caribbean Dr., Summerland Key, Fla. 33042

[21] Appl. No.: 09/200,776

[22] Filed: Nov. 28, 1998

[51] Int. Cl.$^6$ ............................ F16K 35/00; F16K 35/06; E03B 9/06
[52] U.S. Cl. ..................... 137/296; 81/125.1; 81/176.1; 220/724; 220/726; 220/727; 251/291
[58] Field of Search ..................................... 137/296, 371, 137/377, 381, 382, 800; 220/284, 724, 725, 726, 727; 251/291, 292; 81/125.1, 176.1, 176.15, 461

[56] References Cited

U.S. PATENT DOCUMENTS

| | | | |
|---|---|---|---|
| 3,070,115 | 12/1962 | Jester | 137/296 |
| 3,453,655 | 7/1969 | Quinones et al. | 137/296 |
| 3,709,429 | 1/1973 | Diaz | 137/296 |
| 3,935,877 | 2/1976 | Franchesi | 137/296 |
| 4,398,556 | 8/1983 | Peirea et al. | 137/296 |
| 4,484,595 | 11/1984 | Vanek et al. | 137/296 |
| 4,566,481 | 1/1986 | Leopold, Jr. et al. | 137/296 |
| 4,936,336 | 6/1990 | McCauley et al. | 137/296 |
| 5,588,460 | 12/1996 | Meneses | 137/296 |
| 5,630,442 | 5/1997 | Julicher | 137/296 |
| 5,632,301 | 5/1997 | Julicher | 137/296 |

*Primary Examiner*—George L. Walton

[57] ABSTRACT

A method and system for securing the exposed valve stem of the hydrant valve system in order to conserve valuable reserve resources and maintain street water pressure by restricting the unauthorized use therefrom; including a first device keying the exposed valve stem, a second devise containing the exposed portion of the keyed valve stem, a third devise for maintaining ease of rotation, a fourth device for securing the second device to the existing valve system, and a fifth device for engaging and operating the first device. The method and system for modification of the existing valve system to flush or recess the keyed valve stem including the steps of; modifying the design for manufacturing of the keyed valve stem, keyed valve stem wrench, and hydrant or valve containment body; or adding a tamperproof closure module; a keyed valve stem extension; a bearing system of specific clearance between the closure module and the valve stem extension, and operating the keyed valve stem or valve stem extension by means of a keyed wrench.

15 Claims, 8 Drawing Sheets

METHOD AND APPARATUS FOR SECURING A FIRE HYDRANT OR OTHER VALVE DEVICES

BACKGROUND OF THE INVENTION

1. Field of the invention

This invention relates to a system for locking a fire hydrant value device against unauthorized usage by the public.

2. Discussion of Background

In recent years, a system has been developed for supplying water to fire fighters at pre designated locations throughout most of the populated areas. The system utilizes piping to supply water to these locations and a valve system to be used to turn the water on/off by the fire-fighting team when necessary. The valve system consists of a water valve, an exposed valve stem and a hydrant or valve containment body. The water valve is typically located underground or at the bottom of the hydrant. The valve stem, utilized for turning the water on and/or off, is typically located at the top of the hydrant and exposed for usage by authorized personnel. The hydrant or valve containment body is manufactured so that hoses can be attached and is sealed tight so that the water is forced out of the hose attachment openings by street pressure when the valve is opened and the hydrant is filled.

However, the above, as well as other systems, utilize an exposed valve stem that can be operated by means of a standard wrench or any vise like apparatus when attached to the exposed sides of the valve stem and rotated. The existing system in many occasions results in extremely high usage due to operation by unauthorized personnel; resulting in low street pressure and consumption of valuable reserve resources necessary to fight fires.

SUMMARY OF INVENTION

Accordingly, one object of this invention is to provide a novel system and method for securing the exposed valve stem of the valve system.

Another object of this invention is to provide a novel system and method for conserving the valuable reserve resources necessary to fight fires.

Another object of this invention is to provide a novel system and method for maintaining street pressure through restriction of unauthorized usage.

Another object of the present invention is to provide a system and method for modifying the existing valve systems so that unauthorized usage is deterred.

Another object of the present invention is to provide a novel method and system for securing the reserve resources allotted for fighting fires.

It is yet another object of the present invention to provide a novel method and system for securing the valve system in a tamperproof manner.

It is noted that one objective of the present invention is to establish a basic method and system for supplying water through means of a valve system which is secured from usage from the public.

The above and other objectives are achieved according to the present invention by providing a new and improved method for securing the valve stem portion of the valve system.

Accordingly a second aspect of the present invention, is to modifying an existing valve system so that the valve stem portion of the system is secured from unauthorized usage.

Accordingly a third aspect of the present invention, is to provide a new and improved system to act as the valve stem.

Accordingly a fourth aspect of the present invention, is to provide a new tamperproof valve mechanism for securing a valve device to prevent unauthorized actuation by the unauthorized personnel such as utilized in the fire fighting industry, nuclear industry, hydroelectric industry, refinery industry, etc.

BRIEF DESCRIPTION OF THE DRAWINGS

A more complete appreciation of the invention and many of the intendant advantages thereof will be readily obtained as the same becomes better understood by reference to the following detailed descriptions when considered in conjunction with the accompanying drawings, wherein.

DESCRIPTION OF THE PREFERRED EMBODIMENTS

Figure 1:
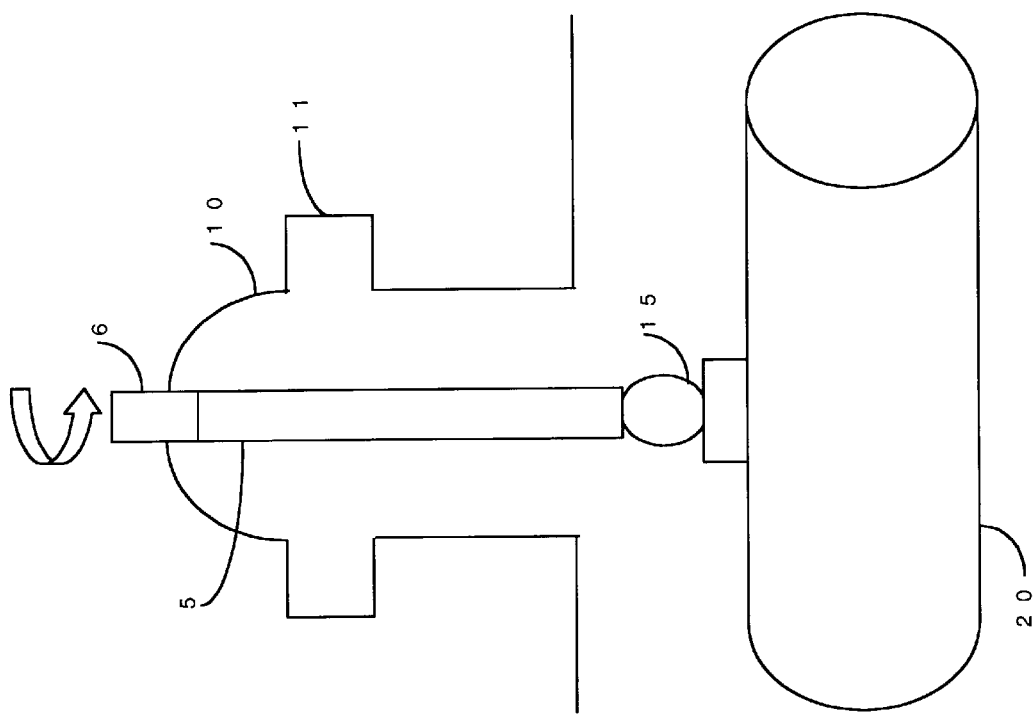
FIG. 1 illustrates a sectional view through an existing valve system.

Referring now to the drawings, wherein like reference numerals designate identical on corresponding parts throughout the several views, and more particularly to FIG. 1 thereof there is illustrated a standard valve system.

Referring to FIG. 1, a sectional view of the standard valve system is illustrated depicting a lower valve stem 5, a screw activating portion 6, a hydrant or valve containment body 10, an on/off water valve 15, and a water supply pipe 20. When the lower valve stem 5 is rotated by means of the screw activating portion 6, it opens the underground on/off water valve 15, pressurizing the hydrant or valve containment body 10 with street pressure from the water supply piping 20, forcing the water to the hose connections 11.

Figure 2:
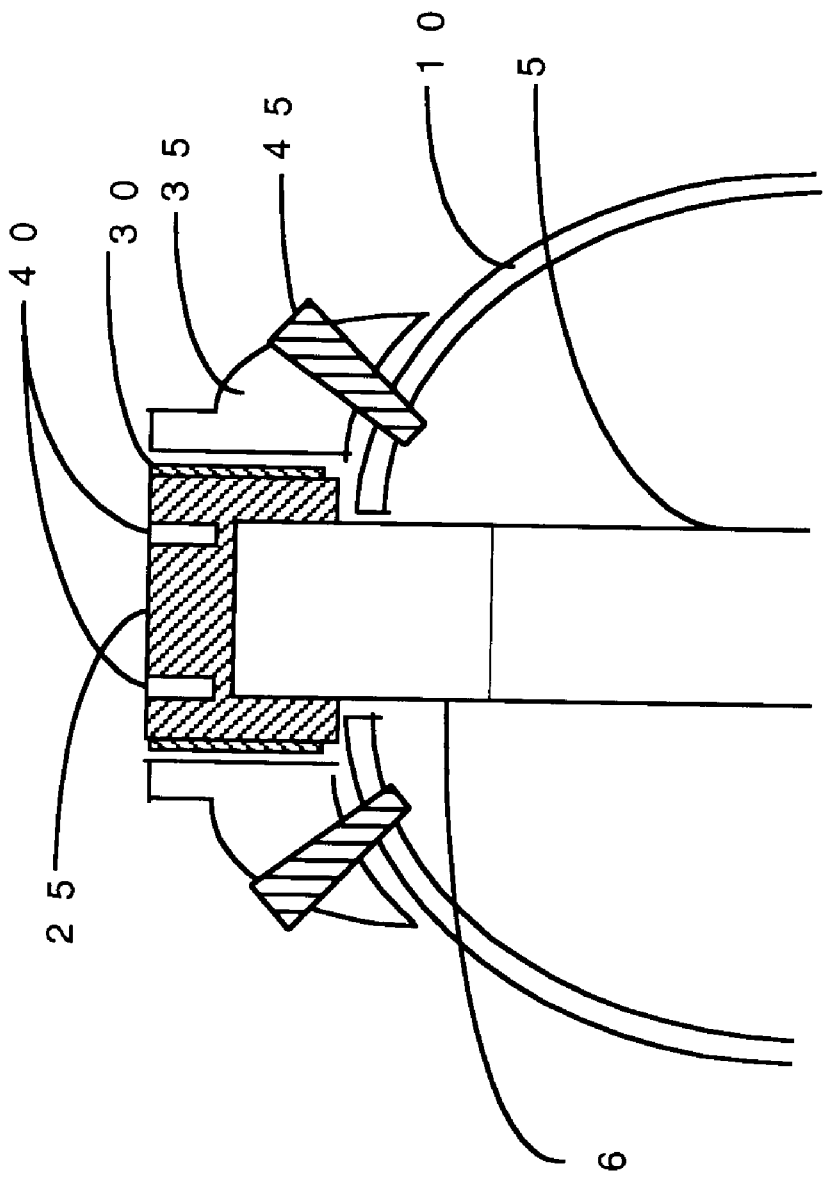
FIG. 2 illustrates a sectional view of the modified upper portion of the hydrant and valve stem configuration according to the present invention.

Referring to FIG. 2, a sectional view of the standard valve system has been modified utilizing a keyed valve stem extension cover 25 fit to the existing screw activating portion 6, a keyed opening 40, a bearing system 30 allowing unrestricted rotation, a closure module 35, and tamperproof attachment 45 for securing the closure module 35 to the existing hydrant or valve containment body 10.

Figure 3:
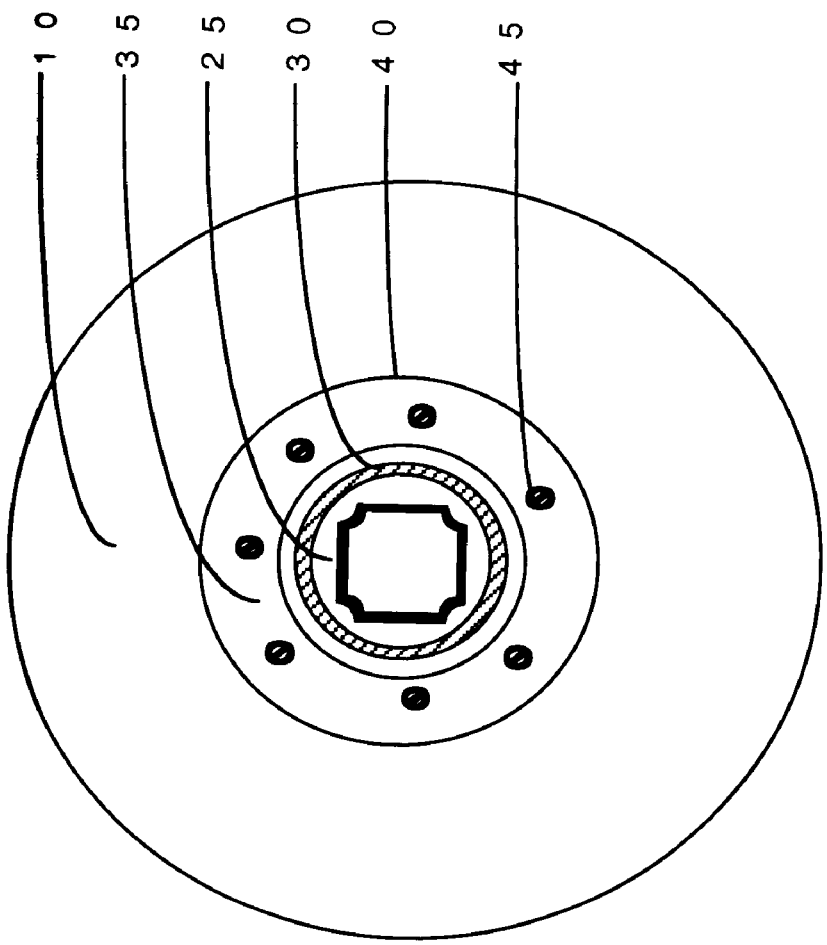
FIG. 3 illustrates a top view of the modified portion of the hydrant and valve stem configuration according to the present invention.

Referring to FIG. 3, a modified valve system has been depicted from the top view indicating the new relationship between the hydrant or valve containment body 10, the keyed valve stem extension 25, the key opening 40, the bearing system 30, the closure module 35, and the tamperproof attachments 45.

Figure 4:
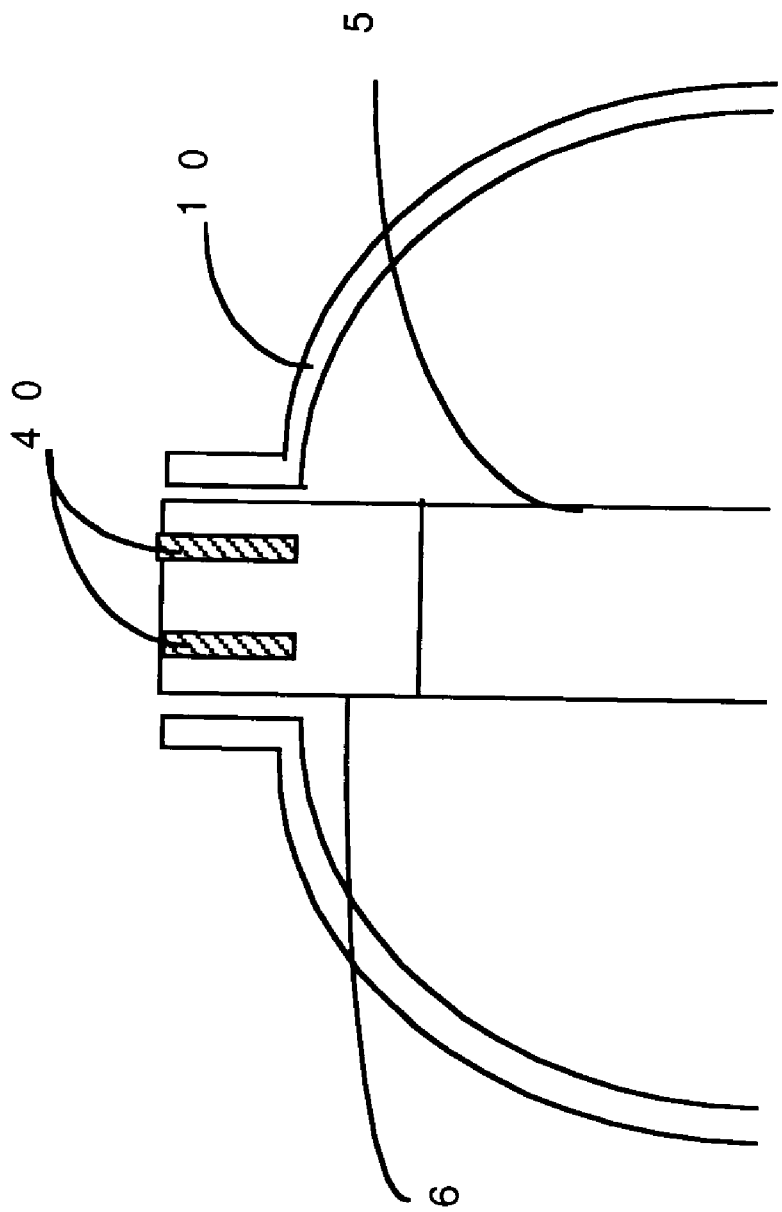
FIG. 4 illustrates a sectional view of a new hydrant and a new valve stem configuration according to the present invention.

Referring to FIG. 4, a sectional view of a modified valve system has been depicted indicating a modified screw activated portion 6. The screw activated portion 6 has been modified by adding a keyed opening 40 at the top and reducing the screw activating portion in height to create a flush relationship with the top of the screw activating portion and the hydrant or valve containment body 10.

Figure 5:
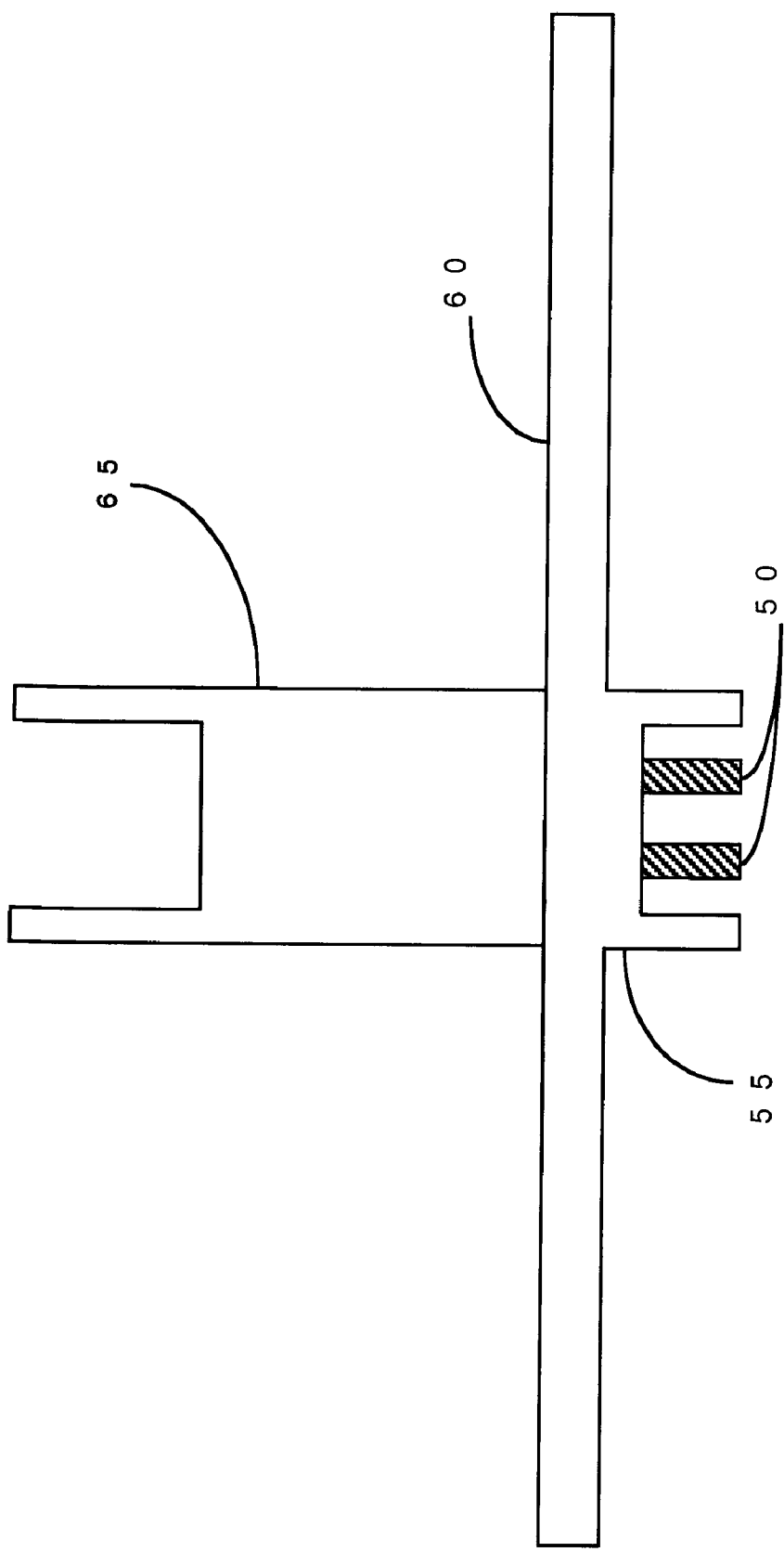
FIG. 5 illustrates a sectional view of a new valve stem wrench according to the present invention.

Referring to FIG. 5, a sectional view of a keyed valve wrench has been depicted indicating a keyed opening extension 50 identical to the keyed opening in the valve stem extension (FIG. 2, 25 & 40 and FIG. 4, 40), a wrench body 55, with an integral wrench handle 60. Also depicted is an optional wrench extension 65.

Figure 6:
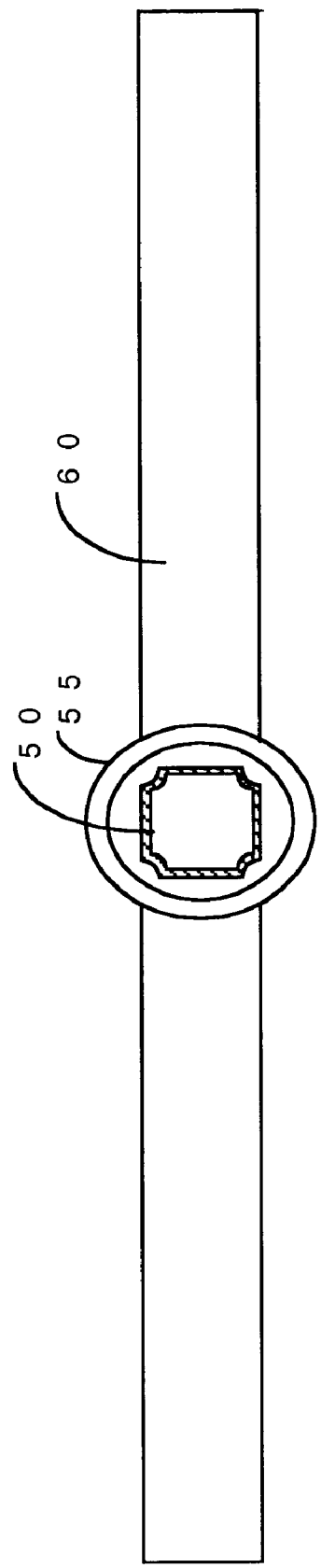
FIG. 6 illustrates a plan view of a new valve stem wrench according to the present invention.

Referring to FIG. 6, a plan view of a keyed valve wrench has been depicted indicating a keyed opening extension 50 identical to the keyed opening in the valve stem extension (FIG. 2, 25 & 40 and FIG. 4, 40), a wrench body 55, with an integral wrench handle 60.

Figure 7:
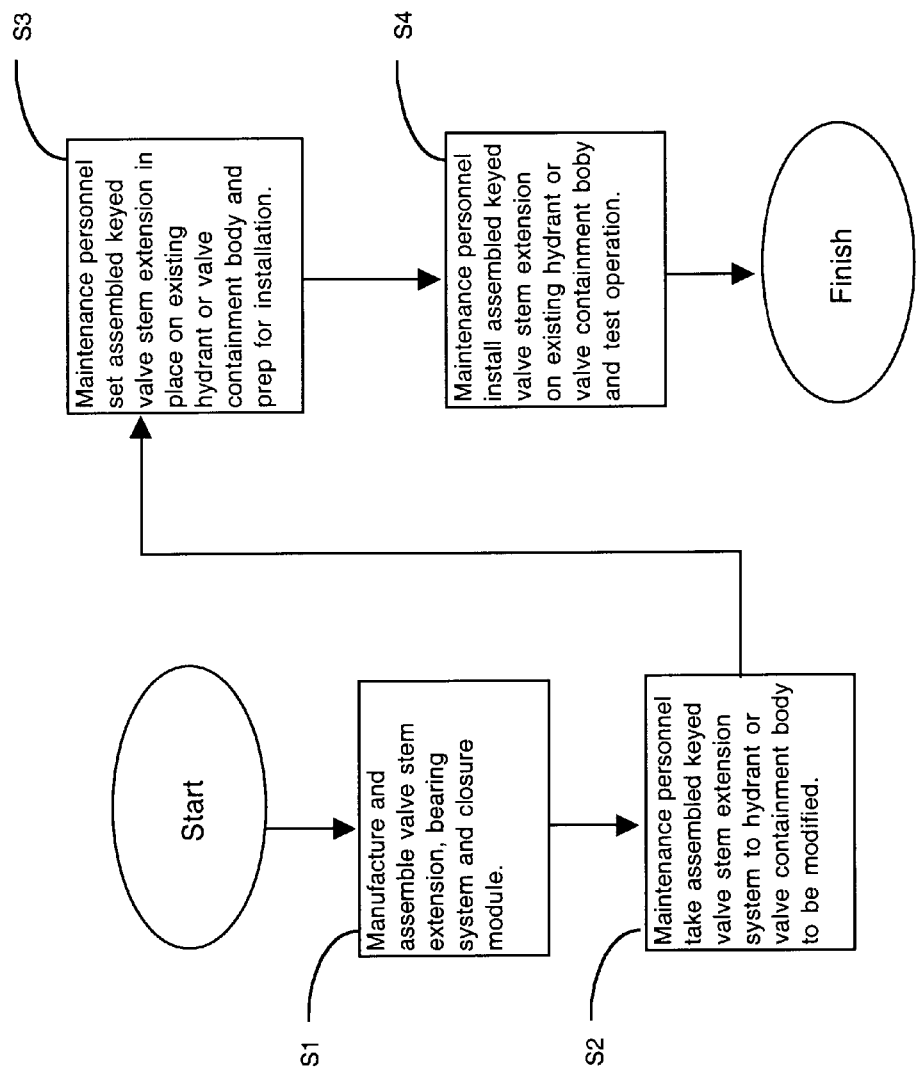
FIG. 7 is a system logic flow chart describing modification of an existing valve system according to the present invention.

Referring to FIG. 7, a system modification flow chart has been provided wherein an existing valve system is modified according to the present invention. In step one S1 the valve stem extension 25 with key opening 40, the bearing system 30, and the closure module 35 with openings for the tamperproof attachments are manufactured and assembled. In step two S2 maintenance personnel go to the valve system to be modified taking the assembly from step one S1 and the tamperproof screws 45. In step three S3 the maintenance personnel set the assembly in place, mark, drill and tap the tamperproof screw openings in the existing hydrant or valve containment body. In step four S4 the maintenance personnel secure the assembly to the existing hydrant or valve containment body by means of the tamperproof screws and test operation with the keyed valve wrench.

Figure 8:
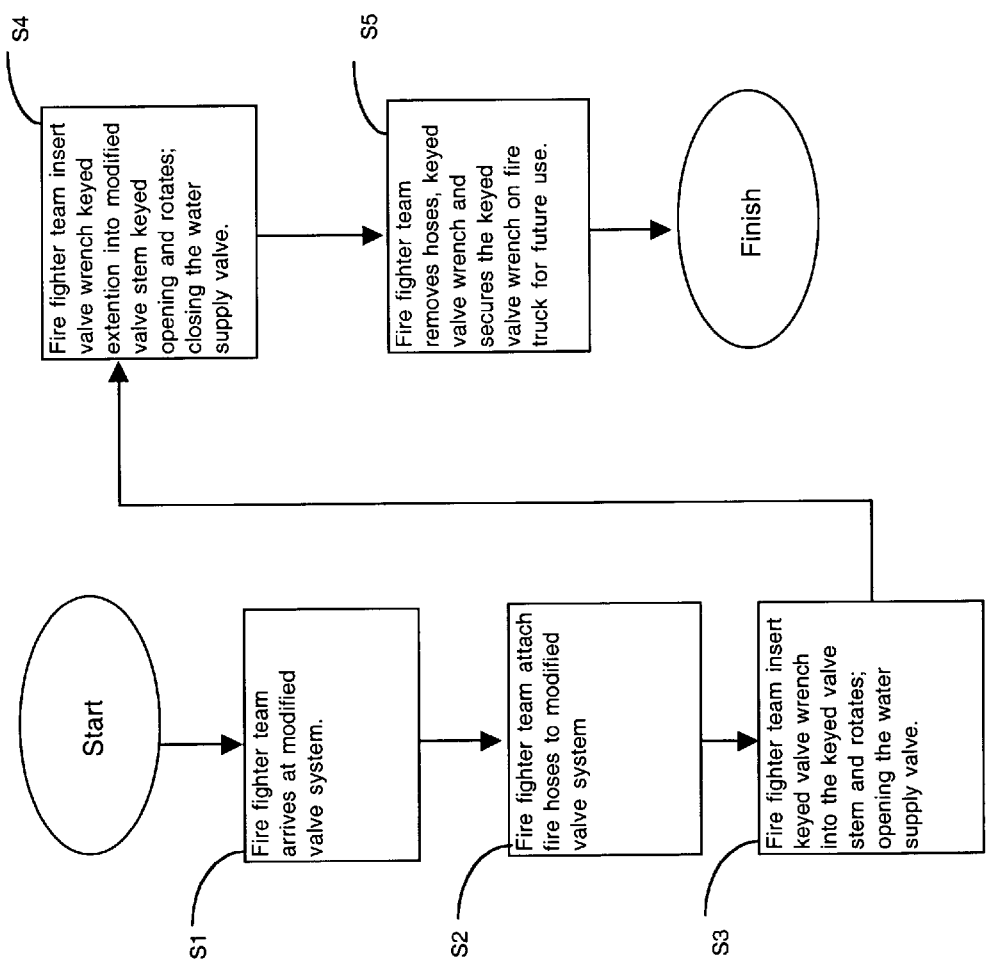
FIG. 8 is a system logic flow chart describing the operation of the present invention.

FIG. 8, a system flow chart has been depicted wherein the operation of the present invention is described. In step one S1 the fire fighting team arrives at the valve system. In step two S2 the fire fighting team attaches their hoses. In step three S3 the fire fighting team inserts the keyed valve wrench into the keyed opening and turns the keyed valve stem; opening the on/off water valve allowing water into the hydrant or valve containment body from the water supply pipe pressurizing the valve system and attached hoses. In step four S4 the fire fighting team inserts the keyed valve wrench into the keyed opening and turns the keyed valve stem; closing the on/off water valve, drains the pressure from the hydrant or valve containment body, and disconnects the hoses. In step five S5 the fire fighting team removes the keyed valve wrench and secures the keyed valve wrench on the fire fighting truck for future use.

The present invention may be implemented using existing valve systems with minor modifications according to the teachings of the present specification, as will be apparent to those skilled in the manufacture of valve systems and fire hydrants. Appropriate hardware can readily be prepared by those skilled in the art based on the teachings of the present disclosure, as will be apparent to those skilled in the manufacturing and assembly arts. The invention may also be implemented by the preparation of application specific integrated manufacturing as will be apparent to those skilled in the art.

Although the preferred embodiment of the present invention is described in terms of utilizing a bearing system between the keyed valve stem extension and the closure module; the ability to rotate the keyed valve stem extension while keeping the valve stem extension and closure module in place could be accomplished by utilizing a specific clearance between the moving parts and/or complimentary offsets between the moving parts to guard against removing the valve stem extension as would be apparent to those skilled in the art of mechanical engineering.

Although the preferred embodiment of the present invention is described in terms of a square recess with concave corners to act as a key opening on the valve stem extension; the key opening could be any recessed or projected shape capable of withstanding the stress and sheer forces exerted upon the keyed valve wrench keyed opening extension and valve stem extension key opening during rotation to open and close the on/off water valve as would be apparent to those skilled in the art of mechanical and structural engineering.

Although the preferred embodiment of the present invention is described in terms of a keyed valve wrench with key opening extension, wrench body, and integral wrench handle; the key opening extension could be manufactured as a typical wrench socket, as will be apparent to those skilled in the art.

Although the preferred embodiment of the present invention is described in terms of a manual keyed valve wrench with key opening extension; the keyed valve wrench socket with key opening extension could be operated by means of a pneumatic, hydraulic, electric, etc. socket driver as would be apparent to those skilled in the arts.

Although the preferred embodiment of the present invention is described in terms of attaching the closure module to the existing hydrant or valve containment body by means of tamperproof attachments; the attachment could be accomplished by means of welding, riveting, epoxies, etc. as would be apparent to those skilled in the arts.

Although the preferred embodiment of the present invention is described in terms of pre assembling the valve stem extension, the closure module, and bearing system and then attaching the system to an existing hydrant or valve containment body; the system could be assembled and installed at the location of the hydrant or valve containment body to be modified as would be apparent to those skilled in the arts.

Although the preferred embodiment of the present invention is described in terms of fitting the valve stem extension over the existing valve stem; the valve stem extension could be mechanically fastened to the existing valve stem by means of welding, riveting, screwing, epoxies, etc. as would be apparent to those skilled in the arts.

The method and system of the present invention is functional because it limits the ability to open the on/off water valve to only those personnel who poses the appropriate keyed valve wrench, it is reliable because the working parts require very little maintenance beyond what is already necessary in the existing system, it is effective because the valve stem and operation therefrom is not readily accessible to any member of the public wishing to engage the on/off water valve; therefore reducing the waste of valuable reserve resources and maintaining street pressure necessary to fight fires by avoiding public negligence.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A tamperproof retrofit device for a fire hydrant that includes valve body having a screw actuating portion extending upwardly therefrom and attached to a lower valve stem which is connected to a valve member at the opposite end, said tamperproof device comprising:

a non-rotatable dome shaped protective cover defined by a wall that is adapted to be positioned over and around at least a portion of the valve body with an opening through the non-rotatable protective cover for receiving a rotatable keyed upper valve stem screw actuating portion, said screw actuating portion is operatively connected to the valve stem;

a means for coupling the non-rotatable protective cover to said hydrant valve body;

a bearing means disposed between the non-rotatable protective cover and the keyed valve stem screw actuating portion for reducing friction and protecting against infiltration of foreign elements;

a rotatable keyed valve stem extension cover being flush with a top portion of said screw actuating portion, said valve stem extension cover having a pentagonal recess in the bottom portion thereof for covering and engaging the hydrant valve stem screw actuating portion, and a keyway either recessed or projected with a plurality of elements on the top portion of said valve stem screw actuating portion; and a keyed valve wrench having a plurality of projected or recessed elements on a bottom portion thereof for engaging the valve stem screw actuating recessed or projected keyway elements for rotating the lower valve stem to actuate the valve member, by means of a rotational force applied to the rotatable keyed valve stem screw actuating portion.

2. The tamperproof retrofit device according to claim 1, wherein the top of the non-rotatable protective cover, the bearing, and the valve stem extension cover, in the assembled condition, are substantially flush with one another constituting an assembly.

3. The tamperproof retrofit device according to claim 2, wherein the rotatable keyed valve extension cover, bearing and non-rotatable protective cover can be pre-assembled and fit together as a unit to aid in alignment for attaching the non-rotatable protective cover to retrofit several different designs of existing hydrant valves.

4. The tamperproof retrofit device according to claim 2, wherein the bearing and/or the rotatable keyed valve stem extension cover can be removed independently from the non-rotatable protective cover for servicing and/or replacement.

5. The tamperproof retrofit device according to claim 2, wherein the assembly is acting to limit access and protect the surface area available for actuation of said hydrant valve screw actuating portion.

6. The tamperproof retrofit device according to claim 2, wherein the bearing could be optional depending upon the sizes and materials being utilized for the non-rotatable protective cover and the rotatable keyed valve stem extension cover.

7. The tamperproof retrofit device according to claim 1, wherein the hydrant valve is actuated by a rotational motion of the rotatable keyed valve stem extension cover by the keyed valve wrench.

8. The tamperproof retrofit device according to claim 1, wherein the bottom portion of the non-rotatable protective cover is attached to the hydrant valve body by means of epoxy, screws, bolts, welding or other methods of attachment to achieve a non-rotatable state.

9. The keyed valve wrench according to claim 1, wherein permanently attached wrench extensions can be added to the wrench handle for further engaging tire lugs and/or said hydrant valve stem actuating screw when the bearing and/or the rotatable keyed valve stem extension cover are removed.

10. A tamperproof valve mechanism for a valve device that includes valve body having a screw actuating portion extending upwardly therefrom and attached to a lower valve stem which is connected to a valve member at the opposite end, said tamperproof valve mechanism comprising:

a valve body for receiving a rotatable keyed upper valve stem screw actuating portion, said screw actuating portion is operatively connected to the lower valve stem;

a bearing means disposed between the valve body and the keyed valve stem screw actuating portion for reducing friction and protecting against infiltration of foreign elements;

a rotatable keyed valve stem screw actuating portion being flush with a top portion of said valve body, said valve stem screw actuating portion having a recess in the bottom portion thereof for covering and engaging the hydrant lower valve stem portion, and a keyway either recessed or projected with a plurality of elements con the top portion of said valve stem screw actuating portion; and a keyed valve wrench having a plurality of projected or recessed elements on a bottom portion thereof for engaging the valve stem screw actuating recessed or projected keyway elements for rotating the lower valve stem to actuate the valve member, by means of a rotational force applied to the rotatable keyed valve stem screw actuating portion.

11. The tamperproof valve mechanism according to claim 10, wherein the rotatable keyed valve screw actuating portion could be integrated into the fabrication of the valve device screw actuating portion.

12. The tamperproof valve mechanism according to claim 10, wherein the assembly could be accomplished by replacing said valve device screw actuating portion with a keyed valve device screw actuating portion creating a flush condition between the keyed valve device screw actuating portion and the valve body.

13. The tamperproof valve mechanism according to claim 10, wherein the top of the valve body, the bearing, and the valve device stern screw actuating portion, in the assembled condition, are substantially flush with one another.

14. The tamperproof valve mechanism according to claim 10, wherein the valve device is actuated by a rotational motion of the rotatable keyed valve screw actuating portion by the keyed valve wrench.

15. The tamperproof valve mechanism according to claims 1 and 10, wherein the tamperproof valve mechanism can be employed to various types of valve devices by means of a keyed actuating portion which is substantially flush with the valve body.

* * * * *